(12) United States Patent
Johansson

(10) Patent No.: US 6,944,928 B1
(45) Date of Patent: Sep. 20, 2005

(54) PROCESS AND APPARATUS FOR PRODUCING A PALLET FROM FOLDED MATERIAL

(75) Inventor: Sixten Johansson, Jäders Hässelby 1 (SE)

(73) Assignee: Olv-Pallen Aktiebolag, Arboga (SE)

(*) Notice: Subject to any disclaimer, the term of this patent is extended or adjusted under 35 U.S.C. 154(b) by 398 days.

(21) Appl. No.: 10/110,462

(22) PCT Filed: Oct. 6, 2000

(86) PCT No.: PCT/SE00/01936

§ 371 (c)(1),
(2), (4) Date: Sep. 10, 2002

(87) PCT Pub. No.: WO01/26983

PCT Pub. Date: Apr. 19, 2001

(30) Foreign Application Priority Data

Oct. 15, 1999 (SE) ................................. 903733

(51) Int. Cl.⁷ ........................... B21D 39/03; B23P 21/00
(52) U.S. Cl. ........................... 29/430; 29/564.1; 29/772
(58) Field of Search ....................... 29/428, 430, 564.1, 29/772; 108/51.3; 493/81, 84, 162

(56) References Cited

U.S. PATENT DOCUMENTS

| 3,131,656 | A |   | 5/1964 | Houle |
| 3,683,822 | A |   | 8/1972 | Roberts et al. |
| 4,498,895 | A | * | 2/1985 | White ................... 493/476 |
| 4,792,325 | A | * | 12/1988 | Schmidtke ............... 493/334 |
| 4,867,074 | A |   | 9/1989 | Quasnick |
| 5,184,558 | A | * | 2/1993 | Wozniacki .............. 108/51.3 |
| 5,207,631 | A | * | 5/1993 | Schmidtke et al. ........ 493/334 |
| 5,372,570 | A | * | 12/1994 | Schmidtke et al. ........ 493/399 |
| 5,487,345 | A | * | 1/1996 | Winebarger et al. ...... 108/51.3 |
| 5,809,902 | A | * | 9/1998 | Zetterberg ............. 108/51.11 |
| 5,836,254 | A | * | 11/1998 | Johansson .............. 108/51.3 |
| 6,041,719 | A | * | 3/2000 | Vidal et al. ............. 108/51.3 |
| 6,159,137 | A | * | 12/2000 | Lee et al. ............... 493/355 |
| 6,192,571 | B1 | * | 2/2001 | Morrison ................. 29/772 |
| 6,839,952 | B2 | * | 1/2005 | Hamilton ................. 29/772 |

FOREIGN PATENT DOCUMENTS

| EP | 0084906 A1 | 8/1983 |
| EP | 0283799 B1 | 11/1991 |
| SE | 354459 | 3/1973 |
| WO | WO 87/04408 | 7/1987 |
| WO | WO 93/16927 | 9/1993 |
| WO | WO 96/11852 | 4/1996 |

* cited by examiner

Primary Examiner—David P. Bryant
(74) Attorney, Agent, or Firm—Jeffrey S. Melcher; Manelli Denison & Selter, PLLC

(57) ABSTRACT

The invention relates to a process and an apparatus for the production of pallets (2), which are assembled from several base beams (4) and at least one load deck (3), which is folded to form a deck level (10) comprising essentially prism-shaped stiffeners in the form of deck projections (12), which load deck (3) is anchored to the base beams (4) in that the projections (12) are inserted into recesses (22) in the base beams (4), which recesses (22) have essentially the same shape as the outer cross-section of the projections (12). According to the invention, production takes place in a pallet assembly machine (1) in that the folded load deck is produced from at least one flat sheet (5) provided with bends (9) by folding of the sheet at set bends, which are to be arranged in the corners of the recesses, a first bend between two of the sides (13, 15) of the projections being folded so that first projection creases (12) are formed, that a number of base beams are placed in a prefixed position to the load deck thus folded forming a prefixed pallet, the projections creases first being brought into position inside the respective recesses, following which the remaining bends of the projection are pressed into the recesses so that the projections acquire the aforesaid essentially prismatic shape and due to which the projections are permanently fixed in the recesses due to the contact obtained between all sides (13, 15, 16) of the projections and said recesses. The invention also relates to a pallet, a blank for a base beam or load deck included in the pallet and a pallet unit consisting of two or more load decks included in the pallet, which are produced according to a process or in a pallet assembly machine according to the invention.

32 Claims, 11 Drawing Sheets

PROCESS AND APPARATUS FOR PRODUCING A PALLET FROM FOLDED MATERIAL

TECHNICAL FIELD

The invention relates to a process for producing pallets, which are assembled from several base beams and at least one load deck, which is folded to form a deck level comprising essentially prism-shaped stiffeners in the form of deck projections, which load deck is anchored on the base beams in that the projections are inserted into recesses in the base beams, which recesses have essentially the same shape as the external cross-section of the projections.

The invention also relates to a pallet assembly machine for the production of pallets, which are assembled from a number of base beams with recesses and at least one load deck to form a deck level which comprises essentially prism-shaped stiffeners in the form of deck projections for anchoring in recesses of the base beams.

The invention relates furthermore to a pallet, a blank for a base beam or load deck included in the pallet and a pallet unit consisting of two or more load decks included in the pallet, which are produced according to a process or in a pallet assembly machine according to the invention.

PROBLEM AND BACKGROUND TO THE INVENTION

Growing mechanization and rationalization have taken place in recent years in the goods transport sector with the aim of trying to reduce the costs of packaging transportation and storage of goods. A not unimportant portion of these costs stems from the production, handling, storage, return and repair of pallets. Hitherto, the most common material for manufacturing standardized pallets has been wood, for which reason wooden pallets are also termed "conventional pallets" below.

Conventional pallets are expensive to produce and therefore have to be reused several times before they can be discarded, which is why pallets are returned to the goods carrier, goods supplier or to the pallet manufacturer following delivery of the goods to the goods recipient. Owing to their considerable weight and bulky volume, and the frequent need for repair caused by rough handling of the pallets, substantial transportation and maintenance costs arise. An attempt has therefore been made to replace the conventional pallets of wood generally used with pallets of a simplified construction and lower prices, which do not need to be returned and reused, i.e. single-use pallets.

A number of such cheaper and lighter pallet constructions are now on the market, formed for example from wood fibre, plastic or combinations of said materials. Lightweight pallets produced from paper, pasteboard and/or cardboard are also available, usually comprising several layers, which are glued to one another, constituting a cheaper, lighter alternative, which is easier to handle than conventional pallets produced from wood. Nevertheless, neither said lightweight pallets nor any other pallet of the single-use type have gained any appreciable use.

The reason for this is probably that the lightweight pallet has not yet been priced sufficiently advantageously in relation to its somewhat poorer technical attributes, such as its lower bearing capacity, poorer resistance to moisture and external damage, for example when the pallets are handled by lifting forks, other than for special purposes. The fact also that the cost of transporting assembled lightweight pallets is normally not much lower than the cost of transporting normal wooded pallets, taking the number of pallets actually delivered into account, is probably a further important reason for the low use of lightweight pallets. This is due to the fact that the assembled lightweight pallets take up essentially the same volume as the normal wooden pallets. To reduce the transportation volume for the new, as yet unused lightweight pallets, these are normally sent to the users in the dismantled state, i.e. in the form of prefabricated partial blanks for final assembly on the spot. Since up to now the recipient has lacked suitable pallet assembly machines, local assembly of pallets has hitherto always taken place more or less entirely manually, with disadvantageously long assembly times per pallet as a result. Even in the case of factory assembly of pallets, prior to delivery to the user, the available assembly aids have been severely limited. Since the technical attributes of the lightweight pallet have been improved considerably recently, so that they now meet the present functional requirements perfectly, at least in relation to their low price, the explicit wishes or parties concerned remain for a process for assembling lightweight pallets which is a least considerably more automated.

OBJECT OF THE INVENTION AND ITS SPECIAL FEATURES

The object of the present invention is to achieve a virtually automatic pallet assembly machine for chiefly local assembly, but also if so desired for factory assembly of lightweight pallets produced from cellulose material and preferably of glued cardboard blanks.

The process according to the present invention is characterized in that production takes place in a pallet assembly machine, in that a folded load deck is produced from at least one flat sheet provided with bends by folding of the sheet at set bends, which are to be arranged in the corners of the recesses, a first bend between two of the sides of the projections being folded so that a first projection crease is formed, that a number of base beams are placed in a prefixed position to the load deck thus folded, forming a prefixed pallet the projection creases first being brought into position inside the respective recesses, following which the remaining bends of the projection are pressed into the recesses so that the projections acquire the aforementioned essentially prismatic shape and due to which the projections are permanently fixed in the recesses due to the contact obtained between all sides of the projections and said recesses.

The apparatus according to the invention is characterized in that the pallet assembly machine comprises a folding station for production of a folded load deck and an assembly station for fixing the load deck to the base beams.

In local assembly, major gains can be achieved in that the volume-intensive transportation of assembled pallets from the manufacturer ceases and is replaced by the transportation of prefabricated components, for example board-shaped partial blanks in sheet stacks, which sheets have been provided with fold lines at a preset distance from one another for folding of the sheet. Significant gains are also made in factory assembly due to the generally fully automated assembly of the lightweight pallet, since assembly takes place much more quickly and with considerably fewer assemblers. Owing to the speed of the machine, the required storage space can be reduced substantially, since the pallets are stored as partial blanks until just before the pallet is to be used. The lightweight pallet is produced from only two different sub-components, to be more precise from a load deck blank and a number of prefabricated base beams, signifying logistical and technical manufacturing advantages.

DESCRIPTION OF DRAWING

The invention is explained in greater detail below with reference to the drawings.

DETAILED DESCRIPTION OF EXECUTION OF THE PALLET ASSEMBLY MACHINE AND A PALLET OF THE LIGHTWEIGHT TYPE ASSEMBLED IN THIS

Figure 10:
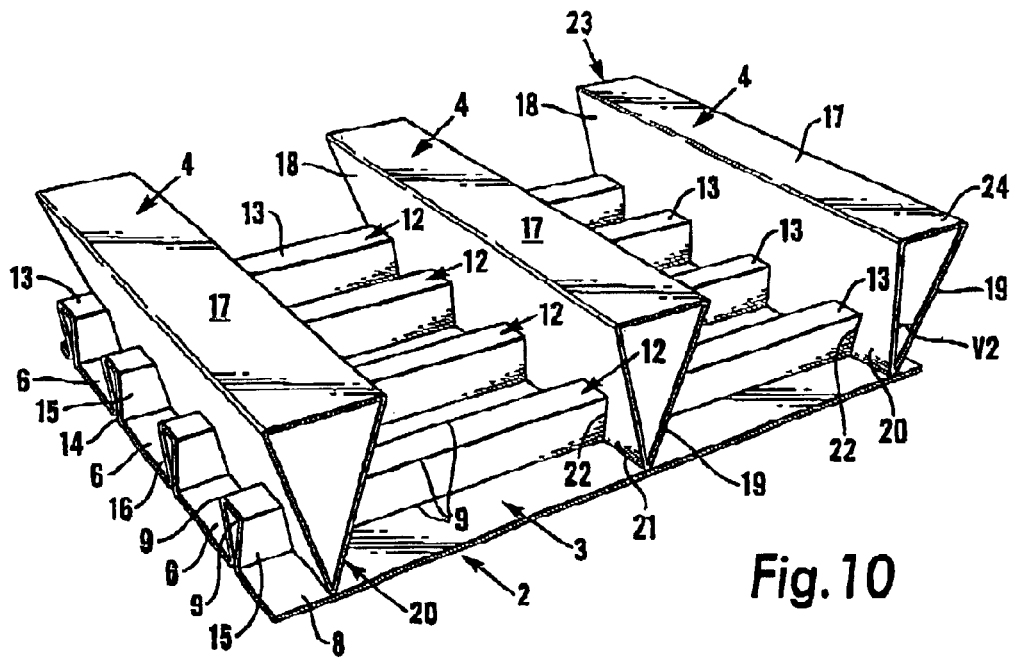
FIG. 10 is a diagrammatic view in perspective of a lightweight pallet assembled and finally fixed in a pallet assembly machine according to the invention, which pallet is shown on its back in an upside-down position.
Figure 11:
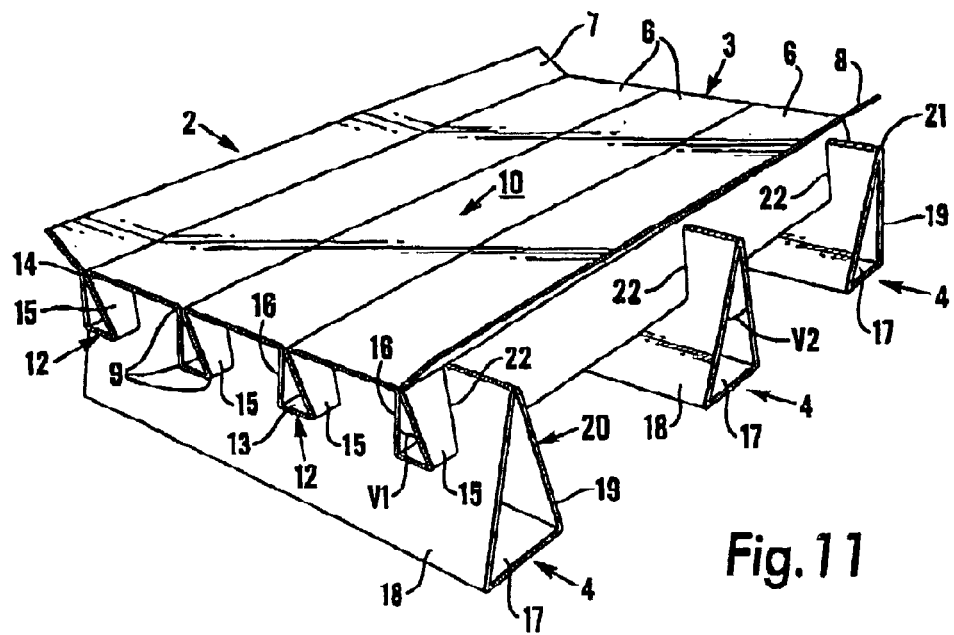
FIG. 11 is a diagrammatic view in perspective of the lightweight pallet shown in FIG. 10, but turned the right way up with the base beams towards the base.

FIGS. 10 and 11 show diagrammatically in a view in perspective an example of a lightweight pallet 2 assembled and finally fixed in a pallet assembly machine 1 according to the invention, which pallet is shown on its back in an upside-down position in FIG. 10 and the right way up in FIG. 11. All the parts of the lightweight pallet 2, which for the sake of simplicity is only to be called pallet 2 below, are manufactured of material in the form of a web which is insufficiently rigid in itself, preferably cellulose material such as paper, pasteboard and cardboard, which material following cutting to a predetermined sheet size is folded, at best parallel to a side edge, so that creased or essentially prism-shaped stiffening parts or components, with a triangular cross-section for example, are formed, which parts and components following folding are fixed to one another in the folded position. A highly stiffened pallet 2 is thus obtained in relation to the starting material. The pallet 2 comprises two separate main components, to be precise a load deck 3 and a suitable number of base beams 4 of the same sort, but always at least two, and in the embodiment shown three, which base beams 4 form the legs of the pallet 2. The material for both the load deck 3 and the base beams 4 consists here, which is the preferred embodiment, of non-plastic-coated cardboard consisting of several layers glued together, which each consist of non-plastic-coated liquid cardboard, i.e. cardboard which has been heavily sized. In said preferred embodiment, the multilayer cardboard has a basis weight of approx. 1100 $g/m^2$. As stated above, the material in the embodiment not shown can also consist wholly or partly of paper, pasteboard or similar material, including plastic or wood fibre material. Cellulose material can for example be rendered hydrophobic by the application of hydrophobizing agents.

Figure 5:
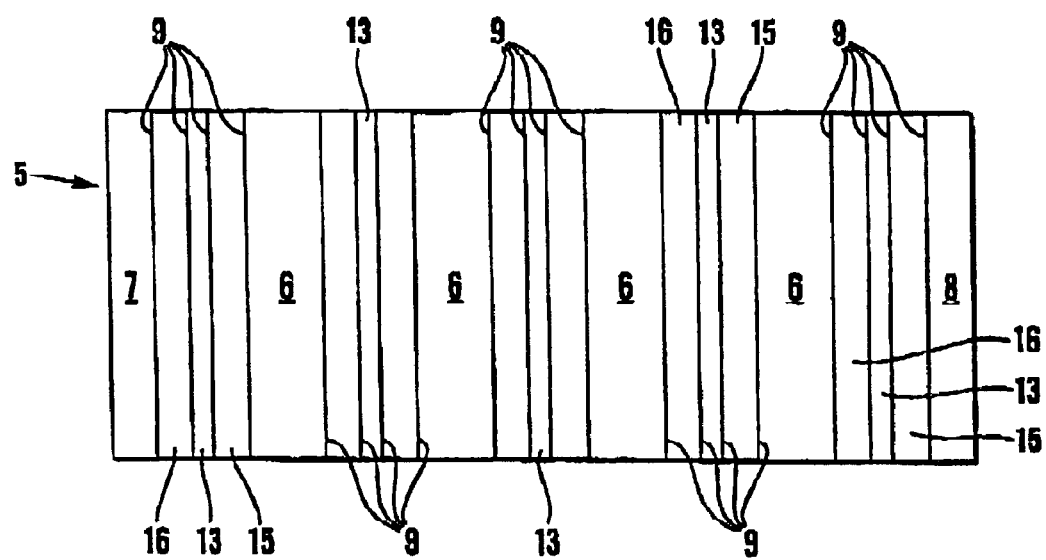
FIG. 5 is a diagrammatic plan view of a flat cardboard blank, which is provided with parallel folds for making folding of the cardboard blank easier to form a load deck included in the lightweight pallet.

In the embodiment of the pallet 2 shown in FIGS. 10 and 11, the load deck 3 consists of a singular flat sheet 5 of cardboard glued together, see FIG. 5, which has first been bent 9, i.e. has acquired a weakening of the material in the form of a fold line for dividing the cardboard sheet 5 into a number of panels 6, 7, 8 parallel to one another, and is then folded along the bends 9 in the pallet assembly machine 1, so that the top side of the load deck 3 created thereby forms a deck level 10, which comprises a number of parallel main panels 6 and two edge panels 7, 8, parallel to the main panels 6, which edge panels 7, 8 are situated at each end of said deck level 10. It is perceived that the singular flat sheet 5 can be bent by means of the bending line 9 for dividing the cardboard sheet 5 into a number of panels 6, 7, 8 parallel to one another, with the most suitable width of said panels 6, 7, 8 for the current pallet 2. The folding station 28 and assembly station 29 are adapted in the manner described below according to the current width of said panels 6, 7, 8.

Following folding, the underside of the load deck 3 has a number of parallel projections 12 running along the bends 9 and stiffening the load deck 3. The projections 12 have an extension which is horizontal to the deck level 10 and which in cross-section increases in width from a position close to the underside of the deck level down towards to the base 13 of the projections. The projections 12 are thus triangular in cross-section in the embodiment shown, the base 13 of the projections forming a lifting surface for lifting forks. It is perceived, however, that any other cross-sectional shape of the projections 12, comprising folded sides, falls within the inventive idea. The said projections 12 are isosceles and the two sides sloping inwards and upwards, towards the apex 14 of the projections, have been designated 15, 16. The main panels 6 and edge panels 7, 8 of the deck level thus adjoin one another at the apexes 14 of said triangles, where the two sloping sides 15, 16 of the projections 12 meet. The acute angle V1 of the triangle comes to approx. 30° according to the embodiment. The load deck 3 can also be produced in the manner described below from several somewhat overlapping flat and rectangular cardboards blanks 5 of the same sort.

The base beams 4, i.e. the legs of the pallet 2, have an oblong, hollow extension and like the load deck 3 are formed from a piece of glued, bent and then folded cardboard. In each whole cross-section, the base beams 4 have the shape of an isosceles triangle with a base side 17 for resting on the current base for the assembled pallet 2 and two longitudinal sides 18, 19, which slope towards one another to form a pointed top part 20. According to the embodiment, this top part 20 has an angle V2 at the apex 21 of approx. 30°. The longitudinal sides 18, 19 of the base beams 4 are just three times as long as the sides 15, 16 of the deck projections 12.

In the top part 20 of each base beam 4, triangular recesses 22 are taken out precisely in front of one another in the two longitudinal sides 18, 19 of the base beam 4, which recesses 22 extend from the apex 21 a set distance downwards towards the base 17 of the base beams 4. The recesses 22 have the same size and shape as the outer cross-section of the projections 12, which project downwards from the underside of the load deck 3. The recesses 22 are made evenly spaced in the base beams 4, which spacing corresponds to the width of the main panels 6 of the deck level 10, and begin and end so that the base beams 4 have a starting end 23 and a finishing end 24 of a length which corresponds to the edge panels 7, 8. The load deck 3 is disposed to be joined to the base beams 4 in the pallet assembly machine 1 by means of dovetailing, in the manner described in greater detail below, in that the deck projections 12, after one of the two bends 9 which between them define the base 13 of the projection 12 has been folded, are first brought into a set position in the respective recesses 22. The remaining bend 9, of the two mentioned above, is then disposed to be folded up inside the respective recesses 22 in the base beams 4. The load deck 3 is intended by means of dovetailing to be preferably anchored in the base beams 4 without the use of bonding agents or fastening elements other than the dovetailing elements themselves, i.e. the projections 12 and recesses 22, at the same time as the triangular shape of the projections 12 is thereby permanently retained. However, bonding agents can also be used as a complement.

The practical example of a pallet 2 described and shown in FIGS. 10 and 11, consisting of a load deck 3 and three base beams 4, is only one of several possible configurations of the pallet 2. Other practical examples of the pallet 2 comprise two or four load decks 3, normally termed half pallet and whole pallet, in contrast to the quarter pallet 2 shown in FIGS. 10 and 11.

Figure 1:
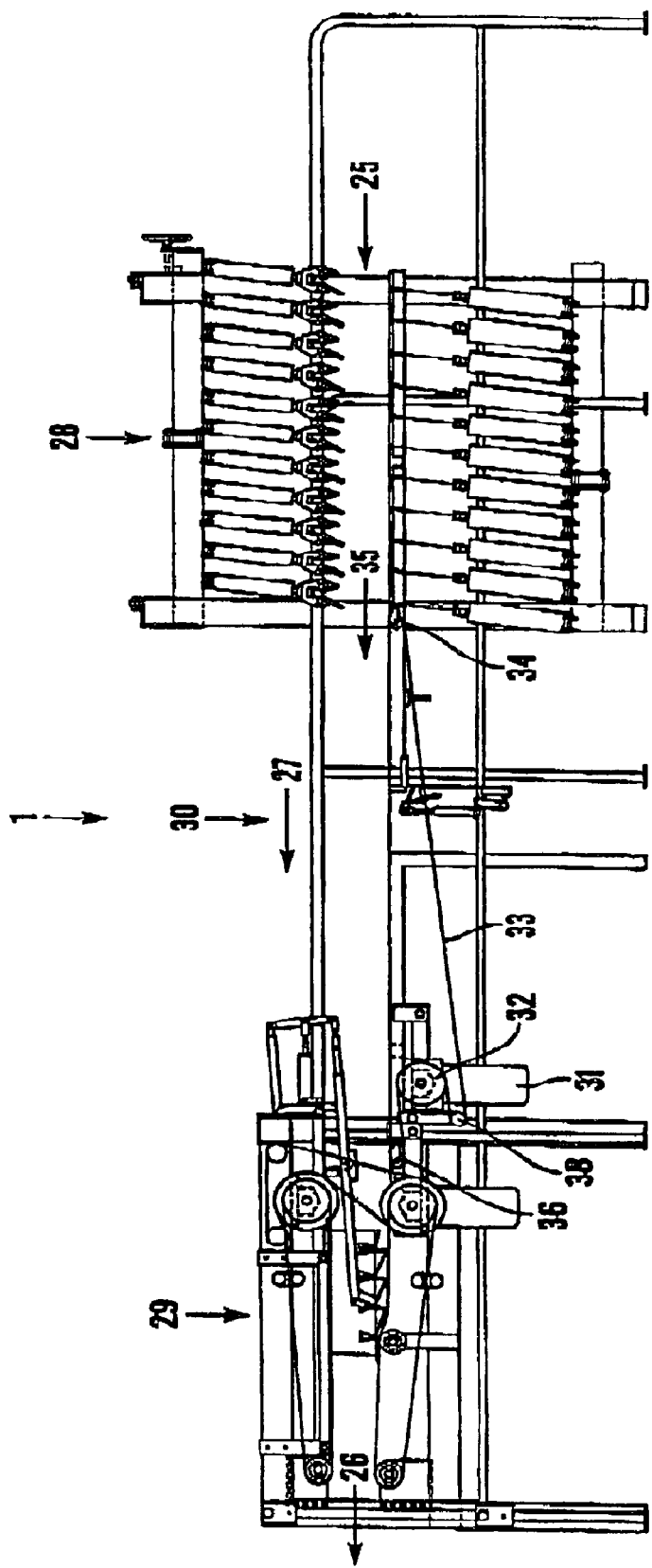
FIG. 1 is a diagrammatic side view of parts of a pallet assembly machine for folding and assembling lightweight pallets according to the present invention, which pallet assembly machine comprises a folding station and a subsequent assembly station.
Figure 2:
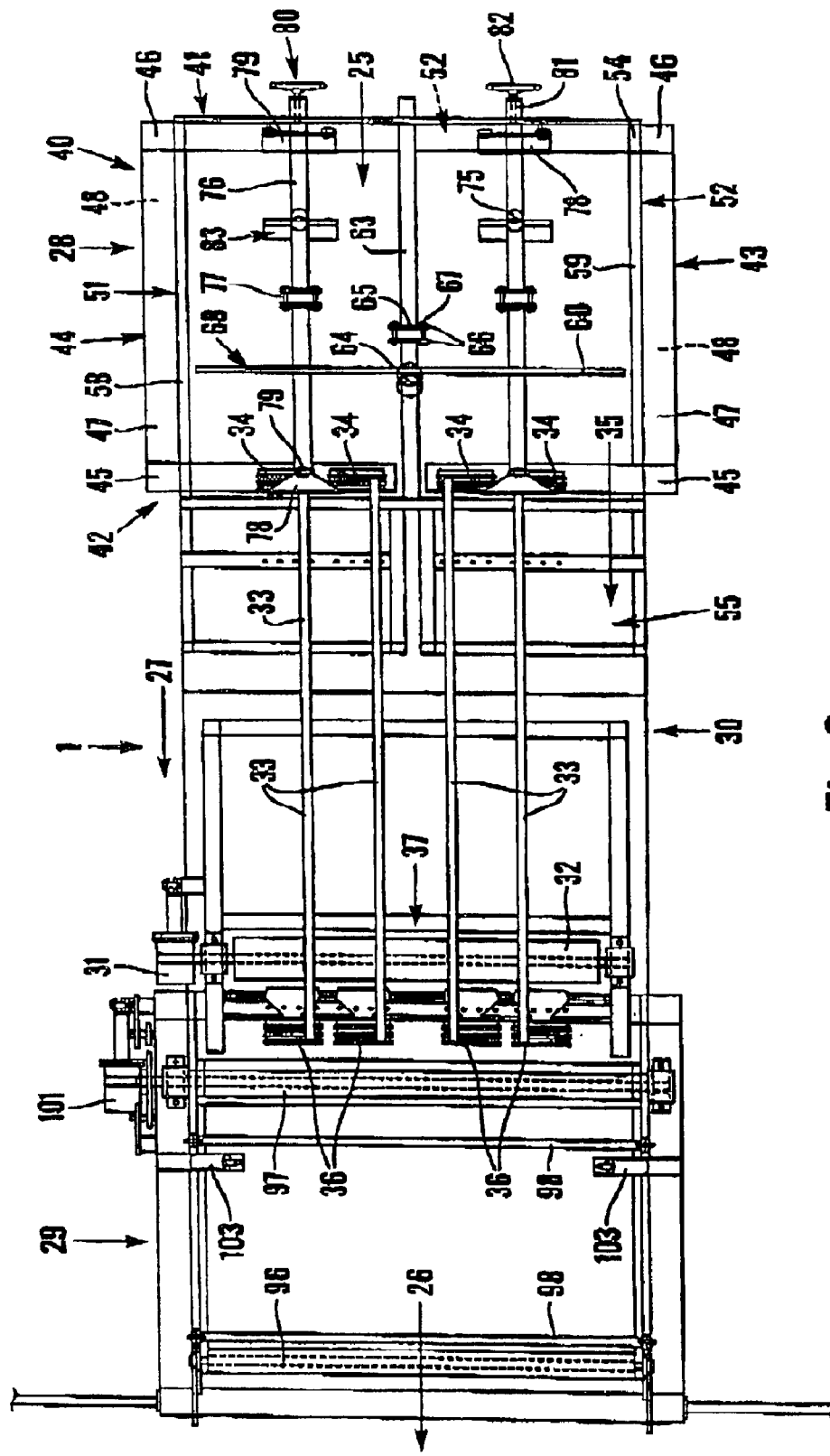
FIG. 2 is a diagrammatic plan view of the pallet assembly machine according to FIG. 1, seen from above.

FIGS. 1 and 2 show a diagrammatic side view and plan view of parts of the pallet assembly machine 1 for the production of lightweight pallets 2, comprising folding and assembly of cut sheets 5 of material in the form of a web, according to the present invention. The pallet assembly machine 1 comprises an intake 25 and an outlet 26, which define a machine direction 27, and two operating stations 28, 29, which are arranged in line following and at a distance from one another, separated by an intermediate conveyor 30. The operating stations 28, 29 consist of a folding station 28, which is shown to the right in FIG. 1, and an assembly station 29 located following the conveyor 30. The intermediate conveyor 30 comprises a motor 31 for driving a drive cylinder 32 arranged rotatably across the assembly station 29, at least one wider or, as in the embodiment shown, several narrower conveyor belts 33, see FIG. 2, which is or are disposed to run over the drive cylinder 32 and further over a number of rotatably disposed turning rolls 34, 36, 38, which have an axial extension across the whole or, see FIG. 1, a part of the pallet assembly machine 1. These comprise, with regard to the feed direction 27 of the conveyor belts 33, rear turning rolls 34 arranged at the outer 35 of the folding station 28, front turning rolls 36 arranged at the intake 37 to the assembly station 29 and a number of lower turning rolls 38 arranged below the drive cylinder 32. The parallel conveyor belts 33, four in the embodiment shown in particular in FIG. 2, are arranged at a distance from one another evenly spaced across the pallet assembly machine 1 and arranged so that each of them runs in its loop over three turning rolls 34, 36, 38 and around the drive cylinder 32 for driving the conveyor belts 33 by means of the motor 31. The conveyor 30 also comprises a suitable number of sensors, which are not shown, however, and which can consist of mechanical, electrical or optical contact breakers, for example. At least one contact breaker is preferably disposed by the finishing end of the conveyor 30 for detecting the presence, position and alignment of a pallet 2 carried on the conveyor belts 33.

Figure 3:
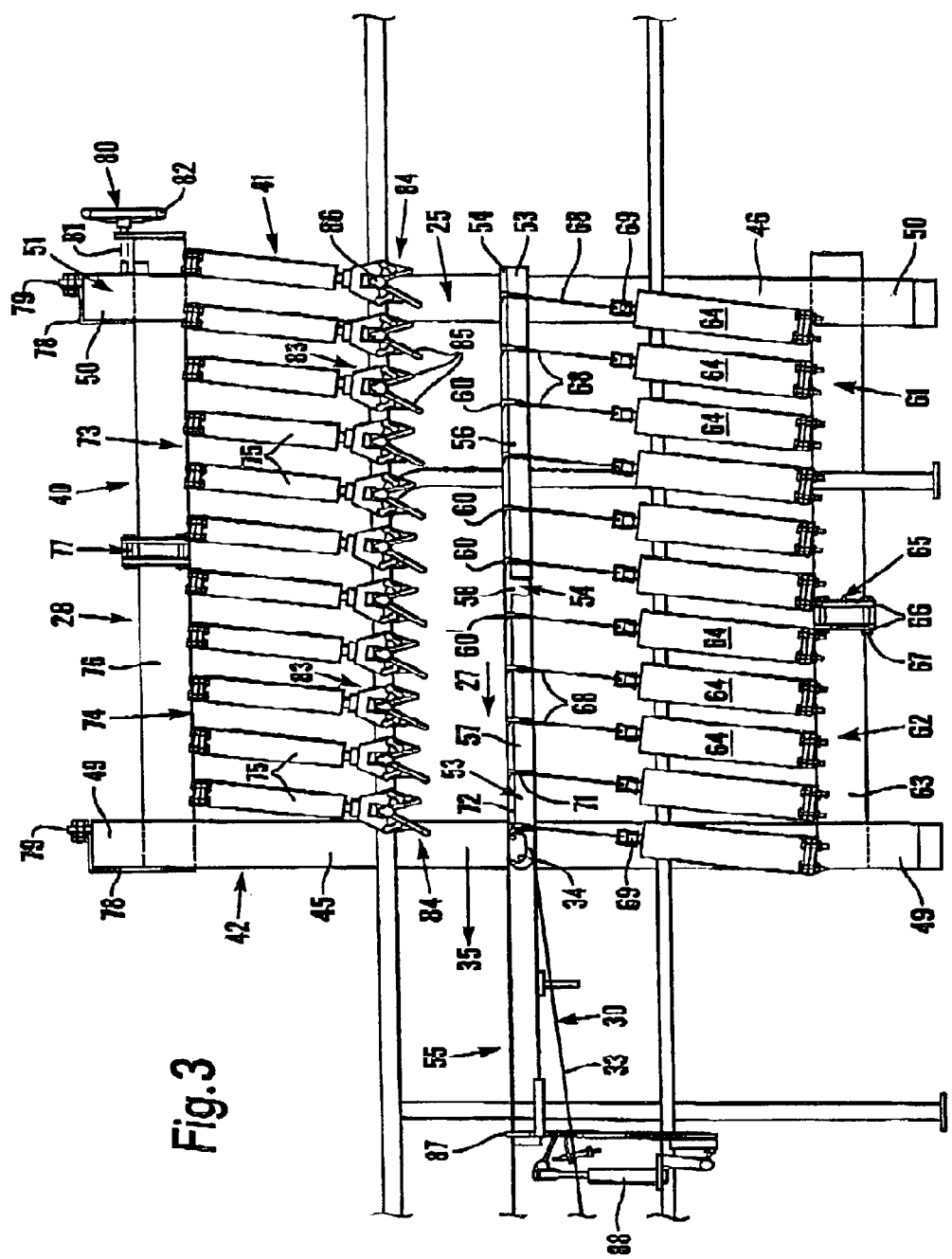
FIG. 3 is a diagrammatic side view of parts of the folding station according to FIG. 1.

The folding station 28, see FIGS. 2 and 3, comprises a four-sided frame 40, which has an upstream, rear side 41 forming the intake 25 to the folding station 28 and thus to the pallet assembly machine 1 and a downstream front side 42 forming the outlet 35 from the folding station 28 as well as two longitudinal frame sides 43, 44 disposed in the machine direction 27. The frame 40 comprises in this connection two front and two back corner uprights 45, 46, between which corner uprights 45, 46 two upper and two lower longitudinal beams 47, 48 are arranged in the machine direction 27 and two upper and two lower transverse beams 49, 50 extend across the machine direction 27. The longitudinal and transverse beams 47, 48, 49, 50 are fixedly fitted to form an upper and a lower horizontal, rectangular frame 51, 52. A horizontal folding table 53 is arranged at a suitable working height for a machine operator. The folding table 53 comprises a rectangular frame construction 54, which is fixedly mounted at the corner uprights 45, 46 with a part 55 corbelling outside the front corner uprights 45. Two rectangular and horizontal table tops 56, 57 extend between the longitudinal sides 58, 50 of the frame construction 54. The table tops 56, 57 are supported displaceably in relation to one another at said longitudinal frame sides 58, 59. Each table top 56, 57 has a number of essentially vertical gaps 60 made across the machine, which gaps are continuous and are evenly spaced. The spacing here corresponds to the width of the main panels 6 of the pallet 2. The distance between the table tops 56, 57 is set so that the minimum distance between the two closest gaps 60, 60' in each table top, see FIG. 3, corresponds to at least the width of the edge panels 7, 8 of the load deck 3.

Under the following table 53, two groups 61, 62 of power cylinders 64 are fitted detachably at their lower ends to a rail 63, see FIG. 2, which power cylinders 64 are preferably evenly spaced within each group 61, 62 and which spacing is at best the same for both groups 61, 62. The rail 63 is best fitted fixedly in the centre of the lower frame 52 between the front and rear cross-member 50. A spacer 65, which has an adjustable width in the machine direction 27, is fitted detachably to said central rail 63 between the two groups 61, 62 of cylinders 64 for setting of the spacer 65 in a set position along the rail 63, and then at best close to the centre of the rail 63. The spacer 65 comprises for example two rectangular frames 66, which enclose the rail 63, and a number of setscrews 67, which extend between the frames 66. The change in width of the spacer 65 is achieved by displacement of the frames 66 in relation to one another by means of the setscrews 67.

A folding ruler 68 is fixed fixedly to the upper end of each power cylinder 64, i.e. to the projecting piston rod 69 of the power cylinder 64. The folding ruler 68, which has the shape of a flat plate arranged in the extension of the power cylinder 64 and thus essentially vertically, extends from the piston rod 69 and further into the gap 60 in the folding table 53 which is situated above each power cylinder 64. In the retracted position of the power cylinder 64, the horizontal top edge 71 of the folding ruler 68 is located inside said gap 60, but under the working surface 72 of the folding table 53. In the projected position of the power cylinder 64, however, the top edge 71 of the folding ruler 68 is located at a set distance above said working surface 72, which distance at least corresponds to the total width of a base side 13 plus one longitudinal side 16 of a projection 12. Since each power cylinder 64 is disposed detachably at the central rail 63, the inclination of the folding ruler 68 in relation to a vertical plans can be increased or decreased somewhat by a slight displacement of the power cylinder 64 along the central rail 63. Sliding which is as friction-free as possible can thus be obtained for the folding ruler 68 inside the gap 60. The two groups 61, 62 of power cylinders 64 can likewise be displaced in relation to one another, the distance between the two folding rulers 68 located closest to one another in each group 61, 62 being able to be adjusted so that the distance at best corresponds to the width of an edge panel 7, or 8, or of a main panel 6. This displacement of the power cylinder groups 61, 62 is achieved by means of the spacer 65, the width of which is adjusted according to the distance selected between said two folding rulers 68. The distance between the two table halves 56, 57 in the folding table must also be adjusted in connection with this displacement of the cylinders 64 for the folding rulers 68 to be able to slide freely in the gaps 60 of the folding table 53.

At a vertical distance above the folding table 53, two groups 73, 74 of power cylinder pairs 75 are fitted detachably to two upper rails 76 arranged horizontally in the machine direction 27, which rails are displaceable across the folding station 28, see FIGS. 2 and 3. The same number of power cylinders 75 is arranged on each upper rail 76 as on the lower central rail 63 and, for each group 73, 74, in a number corresponding to the number of projections 12 for a load deck 3. All power cylinders 64, 75, see FIG. 3, have a slight inclination from the vertical plane, the upper power cylinders 75, which are arranged in pairs in front of each folding ruler 68 across the folding table 53 and in the plane of the folding ruler, sloping forwards in the machine direction, while the lower power cylinders 64 slope backwards towards the intake 25 of the folding station 28. Mounted on each upper rial 76 is a spacer 77, which spacers 77 are of the same type as the spacer 65 arranged under the folding table 53, and which upper spacers 77 are fitted in the same manner and with the same function as the lower spacer 65 described above.

Each rail 76 is suspended on the upper frame 51 via two vertical suspension hooks 78, which are arranged one at each end of the rail 76. Supporting wheels 79 are arranged rotatably at the upper end of each suspension hook 78 for rolling against the top side of the transverse beam 49, 50 on displacement of the rail 76 across the folding station 28. At the rear end of the rails 76 towards the intake 25 to the folding station 28 is a locking device 80 for fixedly locking the rail 76 in a set position across the folding station 28. The locking device 80 comprises a horizontal setscrew 81 with a guide wheel 82 for displacing the setscrew 81 between a locking position lying against the cross-member 49, 50 and an unlocking position at a distance from said cross-member 49, 50.

Fitted controllably to the lower end of each upper power cylinder 75 is a gripping device 83, which gripping device 83 comprises a V-shaped clamp 84. The clamp 84 has two flat clamp parts 85, which are movable around a common hinge 86.

The corbelling part 55 of the folding table 53 has at its free end a controllable stop 87, which can be set by means of a power cylinder 88 in an upper position obstructing a pallet 2 transported by the conveyor 30 above the working surface 72 of the folding table 53, and a lower position under the folding table 53 allowing the pallet 2 to pass. The conveyor belts 33 of the conveyor 30 are arranged in this connection so that they run along and on a level with the working surface 72 of the folding table 53 in the direction of the assembly station 29.

Figure 4:
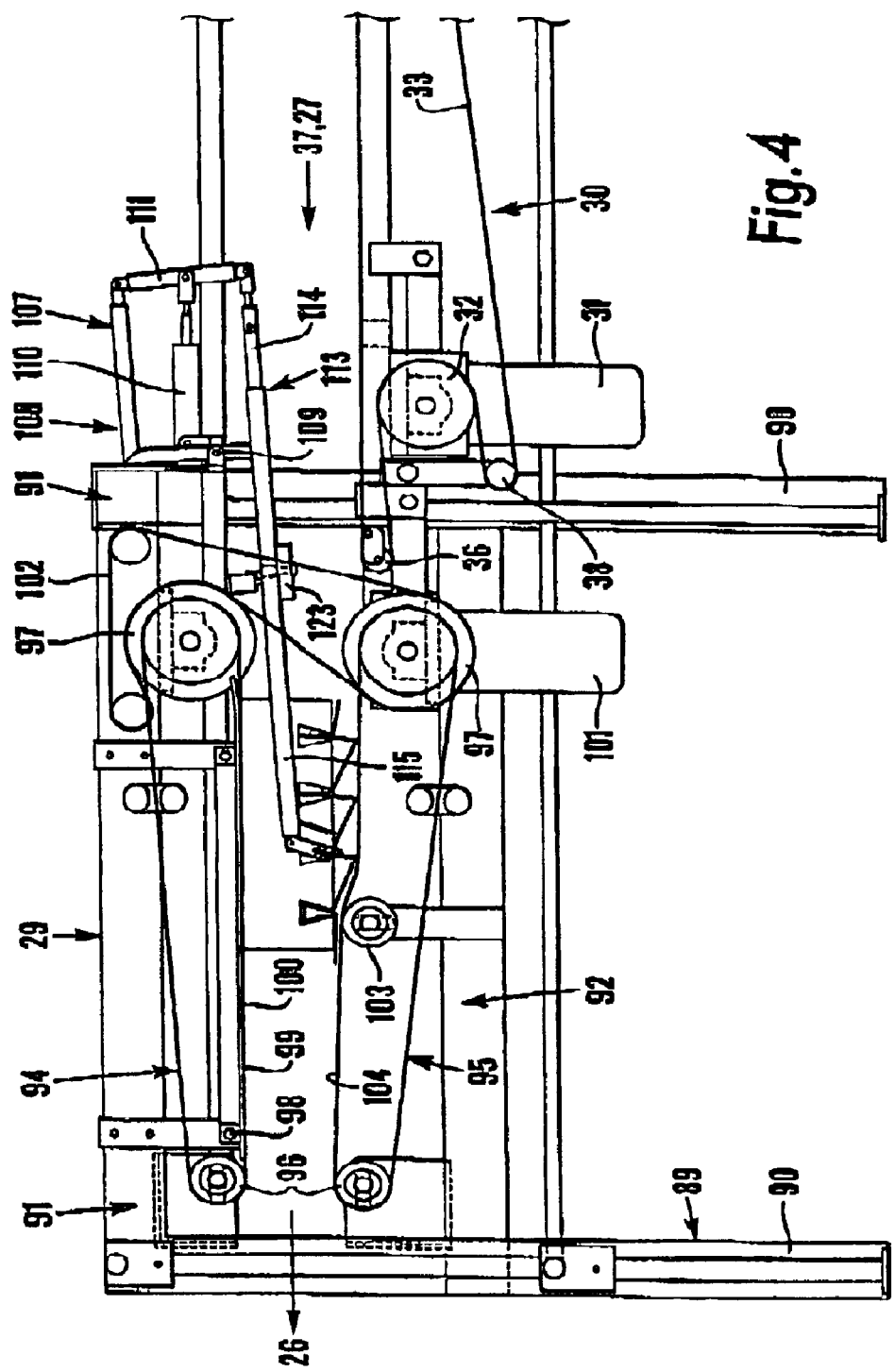
FIG. 4 is a diagrammatic side view of parts of the assembly station according to FIG. 1.

The assembly station 29, see FIG. 4, comprises in the same way as the folding station 28 a frame 89 with four corner uprights 90 and two horizontal rectangular frames 91, 92 arranged at a vertical distance above one another at the corner uprights 90. The assembly station 29 has an intake 37 facing the folding station 28 and an aforementioned outlet 26 arranged on the opposite side for assembled pallets 2. An upper and a lower fabric conveyor belt 94, 95 are disposed to each run in its loop over its front and rear rotatable rolls 96, 97, each of which rolls 96, 97 is arranged in its frame 91, 92 and extending across the assembly station 29 at said intake 37 and outlet 26. The front rolls 96, i.e. the delivery rolls, are arranged right in front of one another at a fixed distance, which corresponds to the thickness of an assembled pallet 2. The rear rolls 97, i.e. the intake rolls, are also arranged at a set distance above one another, which distance corresponds to the thickness of a prefixed pallet 2 arriving from the folding station 28 on the conveyor 30. This means a pallet 2 which in its longitudinal section has a total height of a load deck 3, on which every second bend 9 which directly adjoins a base panel 13 has been left unfolded while the rest of the bends 9 of the load deck 3 are folded, plus the height of a base beam 4 which is placed with its recesses 22 pushed down over the thus only half-folded projections 12, see FIG. 5*g*.

Two rods 98 are fastened at a distance from one another on the upper frame 91 and across the assembly station 29. Fitted between the rods 98 is a horizontal plate 99, which extends from close to the front roll 96 to close to the rear roll 97 and here at a fixed level entirely inside the lower loop part 100 of the upper conveyor belt 94, see FIGS. 4 and 6, to form a fixed, level surface against which a pallet 2 conveyed by the conveyor belts 94, 95 is intended to be pressed. A drive motor 101, which is arranged on one longitudinal side of the assembly station 29, is coupled drivably to the rear roll 97 in the lower frame 92. A drive belt 102 is arranged between and around the two rear rolls 97 for synchronous driving of the conveyor belts 94, 95 by means of the common drive motor 101. A press roll 103 is disposed rotatably inside the loop of the lower conveyor belt 95 at a fixed distance from the plate 99, which distance is greater than the distance between the front rolls 96, but less than the distance between the rest ones 97. More precisely, the distance is somewhat greater than the height of an assembled pallet 2. The press roll 103 is fastened in parallel to the upper rolls 96, 97, in contact with the underside of the upper loop part 104 of the lower conveyor belt 95 and at especially the same distance from the two other lower rolls 96, 97. The three lower rolls 96, 97, 103 are also arranged at such vertical levels in relation to one another that the upper loop part 104 of the lower conveyor belt 95 forms two running planes 105, 106 on each side of the press roll 103, which belt planes 105, 106 converge discontinuously with a first greater and a second lesser inclination to the horizontally arranged lower loop part 100 of the upper conveyor belt 94.

Figure 7:
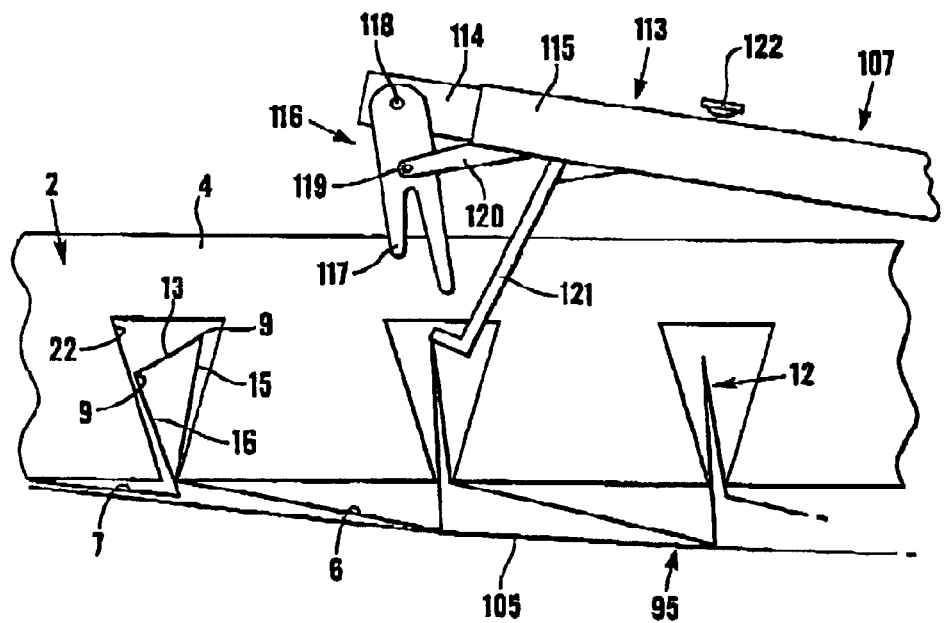
FIG. 7 shows diagrammatically and on a larger scale selected parts of the assembly station according to FIG. 4, and in particular a folding device, which is located in a raised, backwards-turned ready position, comprising a gripping device for folding in the last fold of each projection prior to final fixing of the lightweight pallet.
Figure 8:
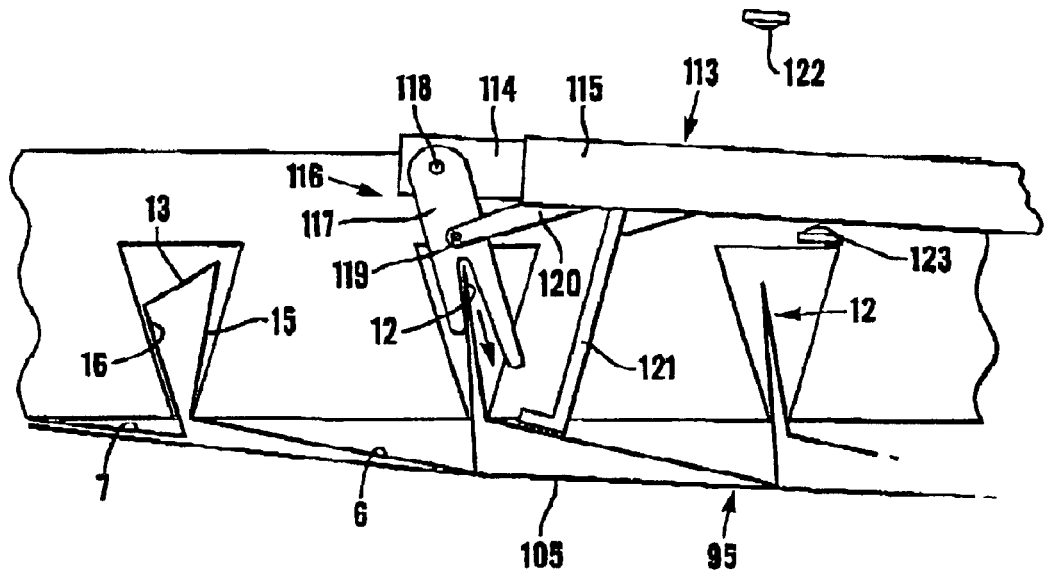
FIG. 8 shows diagrammatically the folding device according to FIG. 7, but with the gripping device in a lowered, yet still backwards-turned position gripping one of the load deck's prospective projections.
Figure 9:
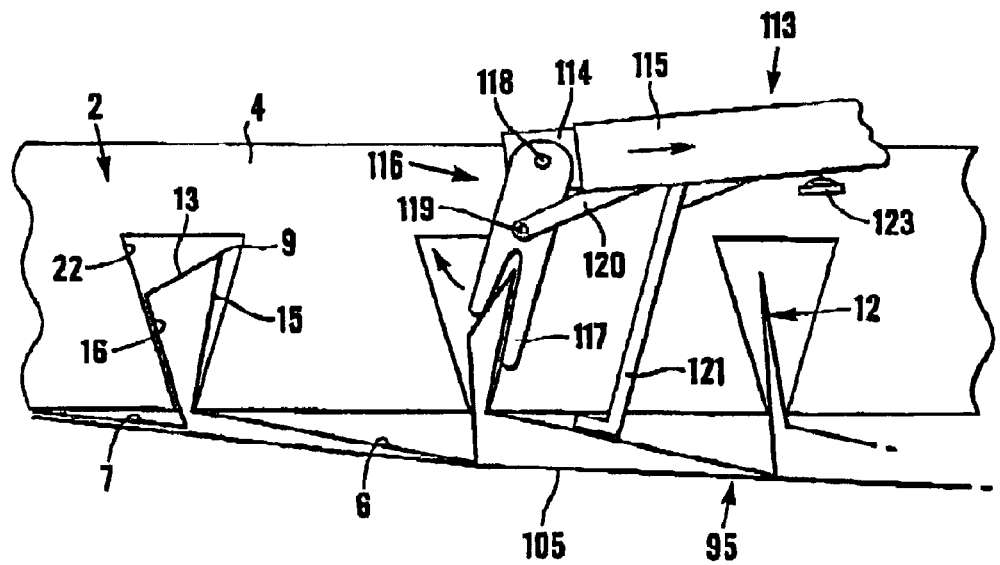
FIG. 9 shows diagrammatically the folding device according to FIG. 7, with the folding device in a lowered, forwards-turned position opening the remaining fold of the projection.

The assembly station 29 also comprises a folding-in device 107, see FIGS. 4 and 7, which has a frame 108 corbelling out from the upper frame 91 towards the folding station, a number of levers 111 mounted on the frame 108 rotatably at their upper ends by means of power cylinders 110, and a continuous folding device 113 at the lower end of each lever 111. The folding devices 113, which are parallel to one another, extend in the direction of the outlet 26 from the assembly station 29. Each folding device 113 comprises two operating arms 114, 115, of which one operating arm 114 is arranged dispaceably inside the other. The inner operating arm 114 is arranged rotatably at its upstream end on the lever 111, while the outer operating arm 115 is mounted rotatably around a hinge 109, which is arranged at a distance from the lever 111 on the frame 108. The folding devices 113 are thus arranged via said levers 111 for maneuvering upwards or downwards around the hinge 109 by means of the power cylinders 110. A gripping device 116, see FIG. 7, is arranged at the ends of the folding devices 113 located downstream, which gripping device 116 comprises either a narrow claw 117 for each folding device 113, or a wider, common claw for two or more folding devices 113. In the embodiment with the wider claw, this extends across the assembly station 29 between said two or more folding devices 113. The claw or claws 117 are fitted rotatably on both the inner 114 and the outer operating arm 115 on each folding device 113 acting with the claw or claws 117 via a first hinge 118 on the inner operating arm 114 and via a hinge 119 and a slewing bracket 120 on the outer. Arranged from each outer operating arm 115 is a detector arm 121, which extends a little way essentially vertically downwards for detecting the projection creases 12 of the transported pallet 2. Finally, two contact breakers 122, 123 are arranged at a set distance from one another, above and below at least one folding device 113, which breakers are shown diagrammatically in FIGS. 7, 8 and 9, for detecting the swinging motion of the folding device 113 at the upper and lower end position of this movement.

All power cylinders 64, 75; 88, 110 in the pallet assembly machine 1 consist at best of pueumaric or hydraulic cylinders, for example, but any other known control device suitable for the machine 1 falls with the inventive idea.

Figure 12:
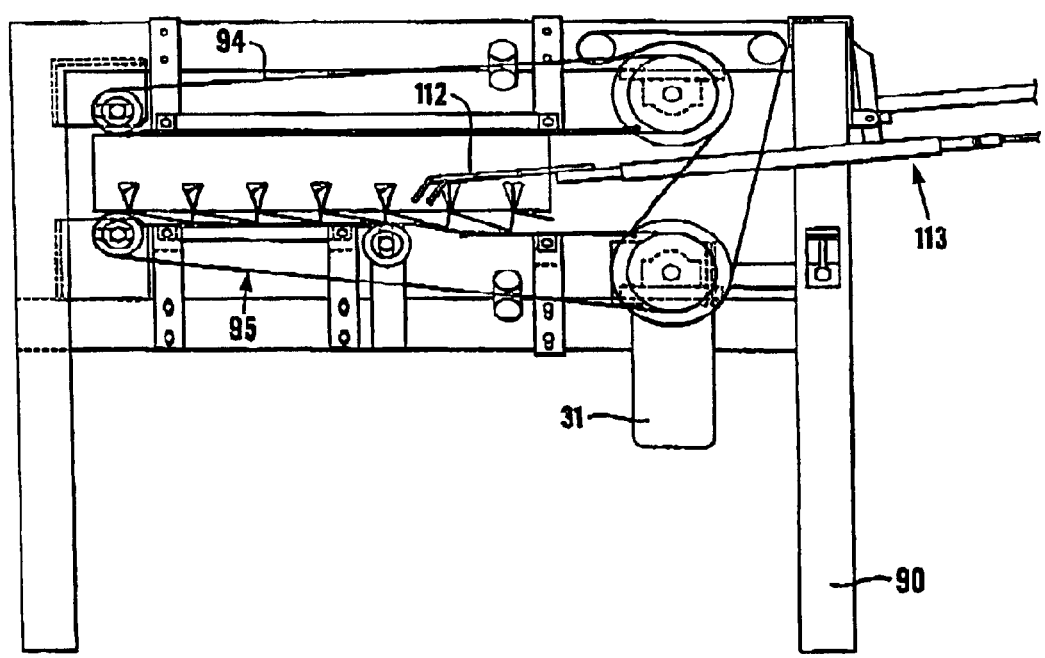
FIG. 12 is a diagrammatic side view of parts of an assembly station according to an alternative embodiment, which assembly station has a folding device comprising a scraping hammer.
Figure 13:
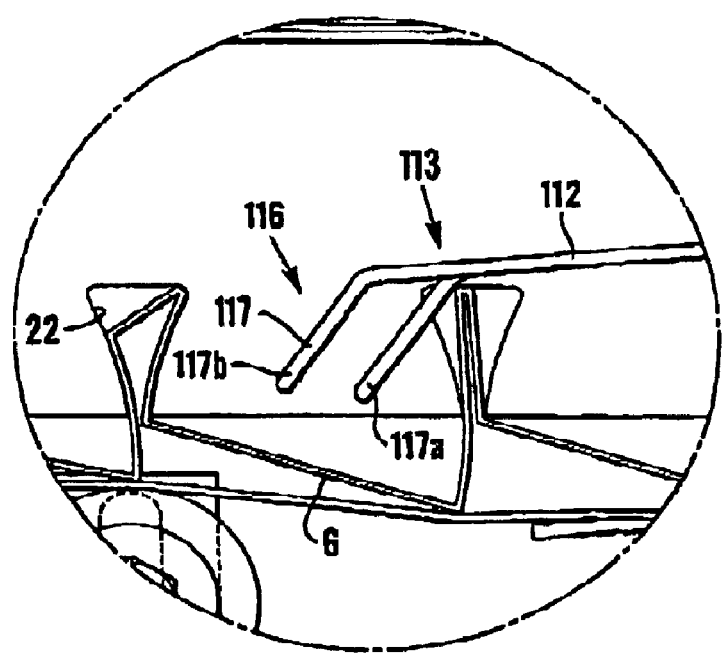
FIG. 13 shows diagrammatically on a larger scale the scraping hammer according to FIG. 12, in a raised first position.
Figure 14:
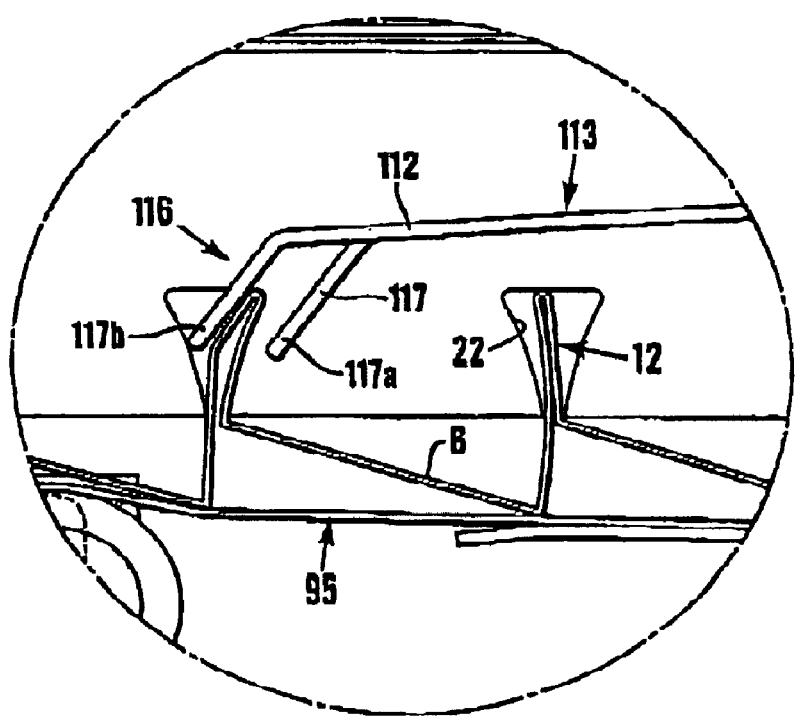
FIG. 14 shows diagrammatically the scraping hammer according to FIG. 13, but in a second lowered position.

FIGS. 12–14 show diagrammatically a side view on a larger scale of an alternative embodiment of the assembly station 29.

The gripping device 116 here has a somewhat different design, the earlier gripping device 116 being replaced by a scraping hammer 112. Instead of a movable claw 117, the scraping hammer 112 comprises a fixed one. The claw 117 is fixed at the farthest end of the operating arm 114 and comprises two gripping parts, which are separated at a set distance from one another, which distance is adjusted according to the deck projection 12. The gripping parts are parallel to one another and extend transverse to the machine direction 27. During operation of the assembly station 29, the scraping hammer 112 is disposed to trail along the deck projections 12 of the transported pallet 2.

The lightweight pallet 2 assembled in the pallet assembly machine 1 is based on the use of flat materials 5 for all constituent parts, which are folded and fixed to form essentially prism-shaped elements 3, 4 which thus acquire stiffening. It is perceived that the elements 3, 4 do not necessarily have to have a triangular, equilateral section but any conceivable cross-section falls within the inventive idea.

The invention is thus not restricted to the embodiment shown, but can be varied in different ways within the scope of the claims, for example with more or fewer pairs of opposing folding rulers 68 and gripping devices 83, other numbers of spacers 65, 77, rails 63, 76, load decks 3, base beams 4 etc.

FUNCTIONAL DESCRIPTION

Figure 5A:
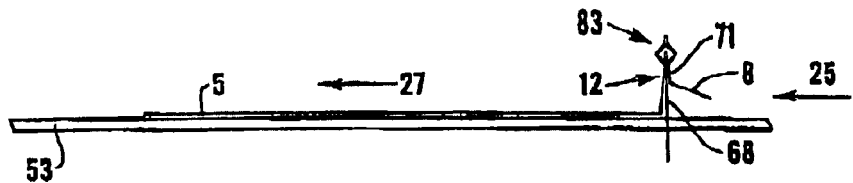
FIGS. 5a–5g show diagrammatically the procedure in the folding station for producing a prefolded, i.e. creased load deck from the cardboard blank shown in FIG. 5 and prefixing of the prefolded load deck by means of a first base beam.
Figure 5B:
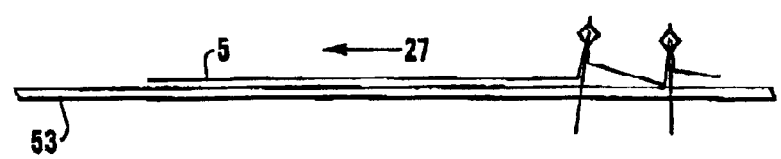
Figure 5C:
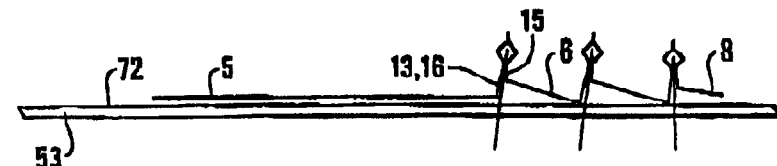
Figure 5D:
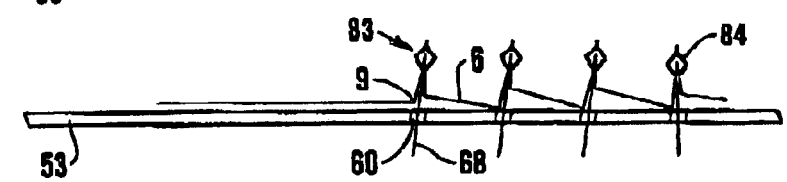
Figure 5E:
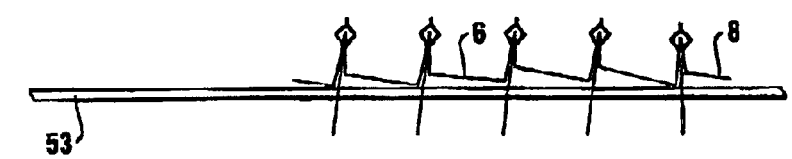
Figure 5F:
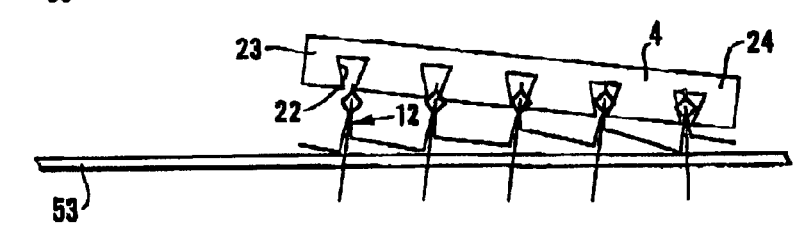
Figure 5G:
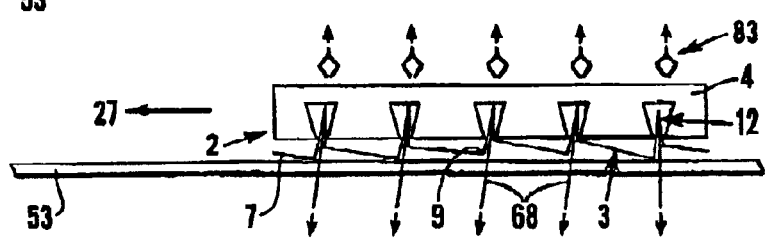

The procedure, see FIGS. 3, 5–5g for producing lightweight pallets 2, comprising folding and assembly of cut sheets 5 of material in the form of a web, is initiated in that the machine operator, who is located at the intake 25 to the folding station 28, manually places a first unfolded cardboard sheet 5 provided with the aforesaid prefabricated and mutually parallel bends 9 on top of the folding table 53. The cardboard sheet 5 is placed in this connection in its longitudinal direction in such a way that its rear short end is disposed essentially parallel to the edge of the folding table 53.

The machine operator then starts the production process by means of a switch, not shown. One of the front power cylinders 64 in the first group 61 of cylinders 64 under the folding table 53 is thus activated, preferably the power cylinder 64 located closest to the intake 25. A first folding ruler 68 is pushed up to a preset level above the working surface 72 of the folding table 53 out of the gap 60 in the folding table 53 which is situated above said power cylinder 64. A first bend 9 is folded manually by the operator above the top edge 71 of the folding ruler 68, preferably the bend 9 between the rear longitudinal side 15 of the rearmost projection 12 in the feed direction 27 and the base 13 of said projection 12, of FIG. 5a. The projection crease 12 formed in such a manner forces the sheet 5 to take up a predetermined position along the folding ruler 68 which is correct for continued folding, from which position the sheet 5 is prevented from moving forwards and backwards in the machine direction 27.

The operator then leaves the machine 1 to fetch the number of base beams 4 which the current pallet 2 contains, either manually actuating a switch or automatically breaking a light curtain. The power cylinders 75 above the folding table 53 which are opposite relative to the folding ruler 68 pushed up by the activated lower power cylinder 64 are activated. A first gripping device pair 83 is pushed down to and meets the folding ruler 68 pushed upwards, the clamp 84 of each gripping device 83 gripping on both sides 13, 15 of the sheet 5 so that this is clamped firmly downwards against the sides of the folding ruler 68. The power cylinders 64, 75 remain in their projected positions with the cardboard sheet 5 caught between the folding ruler 68 and the clamps 84, following which the next row in the lower and upper group 61, 73 of cylinders 64, 75 is activated. A second folding ruler 68 is pushed up, the corresponding band 9 of the next projection 12 automatically ending up in the correct position along the upper edge 71 of said second folding ruler 68, since the cardboard sheet 5 is kept aligned by the first folding ruler 68. The next upper power cylinder pair 75 is activated and its gripping device 83 is guided downwards, meets, grips and pushes down the sheet to the right level on the folding ruler 68 to finally fold the sheet 5. The process continues then continuously with the remaining bends 9 until the sheet 5 is folded at all the prospective projections 12 for the current load deck 3, except for the bend 9 located downstream at each prospective projection 12. This bend 9 is the last to be pushed up into the correct position in the respective recesses 22 of the base beam, which takes place in the assembly station 29 in the manner described below, for which reason this bend 9 is left unfolded as yet.

The operator then places the number of legs of the pallet 2, i.e. the base beams 4, determined by the expected load essentially evenly spaced over the width of the pallet 2, pressing each base beam 4 down into such a position that its recesses 22 prefix all projection creases, see FIGS. 5f and 5g. The operator leaves the machine 1 to fetch the next sheet 5, while, initiated in the same way as previously, the clamps 84 of the gripping devices 83 open, the power cylinders 64, 75 are caused to draw the respective gripping devices 83 and folding rulers 68 back to their starting positions shown in FIG. 3, so that a freestanding, prefixed pallet 2 remains on the folding table 53.

The operator fetches his new cardboard sheet 5, returns to the machine 1, pushes the prefixed pallet 2 out using the fetched cardboard sheet 5 s0 that the pallet 2 ends up in front at the first turning rolls 34 of the conveyor 30, which are either operating or set in motion when the pallet 2 arrives. The conveyor 30 then conveys the pallet 2 further downstream to the assembly station 29, the folding station 28 being free once more to commence the same phase again.

Figure 6:
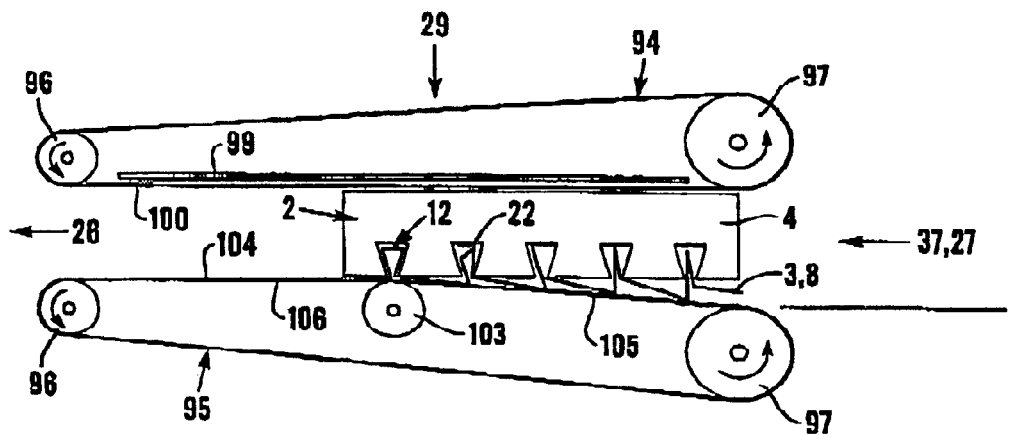
FIG. 6 is a diagrammatic side view of parts of the assembly station according to FIG. 4, in which assembly station final assembly of a lightweight pallet prefixed in the folding station has been initiated.

The conveyor 30 guides the pallet 2 in between the two intake rolls 97, see FIG. 6, from where the upper and lower conveyor belts 94, 95 take over transportation through the assembly station 29. Since the two conveyor belts 94, 95 converge towards one another, a pressing and gradually increasing force is obtained on the projection creases 12 inside the recesses 22, for which reason the projection creases 12 are pressed upwards and inwards into the recesses 22. Just before the pallet 2, arrives at the press roll 103, the first projection crease 12 in the direction of transportation 27 encounters the detector arm 121, see FIGS. 4 and 7. The detector arm 121 forces the folding device 113 to pivot upwards around the hinge 109 on the frame 108 until the outer operating arm 115 strikes the contact breaker 122.

The breaker 122 causes the power cylinder 110 at the upstream end of the folding device 113 to retract, so that the inner operating arm 114 is displaced by means of the lever 111 inside the outer operating arm 115 towards the outlet 26 from the assembly station 29. The claw 117 of the gripping device 16, which is directed downstream from the start, now pivots backwards to a raised and backwards-turned ready position in line with the projection crease 12, see FIG. 7. The pallet 2 continues to be transported downstream by the conveyor belts 94, 95, for which reason, when the detector arm 121 has passed the projection crease 12, the folding device 113 drops down towards the lower contact breaker 123, when is then actuated, see FIG. 8. The power cylinder 110 is activated once again, but in the opposite direction, which power cylinder 110 is this time extended so that the inner operating arm 114 is drawn counter to the flow inside the outer operating arm 115. The claw 117, which now straddles said projection crease 12, is rotated about the hinges 118, 119, and changes direction from pointing upstream back to pointing downstream, see FIG. 9, the projection crease 12, more precisely the bend 9 between the base panel 13 of the projection and the longitudinal side 15 of the projection 12 situated most upstream, is guided in towards the upstream corner of the recess 22, at the same time as the bend 9 situated downstream between same base panel 13 and its longitudinal side 16 situated downstream is now folded. The pallet 2 is conveyed downstream to the press roll 103, which presses the pallet 2 further up against the upper conveyor belt 94. Since this runs against a fixed surface, i.e. the plate 99, the pallet 2 cannot go any further upwards, for which reason the pressure, just on passing the press roll 103, will increase so much that the bends 9 of the projection 12 are pressed up into the corners of the recess 22. The press roll 103 does not need here to press the bends 9 into the bottom of the respective corners, but only so much that the bend 9 is folded in the right direction. The folding-in device 107 then continues with the next projection crease 12 in the same manner, until all bends 9 have been brought into the correct position prior to final fixing between the outlet rolls 96 and the entire pallet 2 has passed the press roll 103. Correct position means here that the rear bend 9 is folded in towards the rear corner, while the front one is pressed up towards the front corner so that the projection is virtually in place in the recess 22. The last compression of the pallet 2 then takes place between the outlet rolls 96, with which the projection 12 is fixed permanently in the recess 22. The now assembled pallet 2 finally passes out through the outlet 26 from the assembly station 29 for manual or automatic transportation onwards, for example to a store.

The rigidity of the load deck 3 in the direction transverse to the stiffening projections 12 is increased substantially due to the fact that the projections 12 are folded in the manner described below to give their final triangular configuration inside the likewise triangular recesses 22 in the top part 20 of the base beams 4, and here in such a way that all loads normally applied subsequently endeavour to increase the contact, and thus also fixing between the projections 12 and said recesses 22.

In the alternative embodiment of the assembly station 29 shown in FIGS. 12–14, the process take place diagrammatically in the following manner. The pallet 2 is guided in between the upper and lower conveyor belts 94, 95, and due to the fact that the pallet 2 unfolded is somewhat higher than the distance between the conveyor belts 94, 95, the pallet 2 will be pressed firmly and driven forwards against the scraping hammer 112. The first claw part 117a of the scraping hammer 112 in the direction of advance draws the deck projection 12 backwards towards the intake to the assembly station 29 at the same time as said claw part 117a slides over the deck projection 12. In the event that the deck projection 12 has not been pulled back to the maximum extent when the claw part 117a has slid over the deck projection 12, the claw part 117b will drop down like a hammer on the deck projection 12 and draw the deck projection 12 backwards. The scraping hammer can also be loaded with weights if the cardboard sheet 5 is stiff. Observe that this scraping phase described above takes place when the lower conveyor belt 95 lacks support under the current deck projection 12. The absence, and the cushioned mat therefore make it possible to displace the pallet 12 forwards at the same time as the scraping hammer 112 holds back the deck projection 12. The pressure force on the deck projection 12 thus increases as the deck projection 12 approaches the press roll 103, the bending line 9 of the cardboard sheet 5 being folded.

ALTERNATIVE EMBODIMENTS

When assembling half-pallets, not shown, which consist of two cardboard sheets 5 which are arranged one after another in the longitudinal direction to form an extended deck level 10, the operator first places a first sheet 5 on the folding table 53 in such a way that its front edge in the conveying direction 27 lies against the stop 87 at the front edge of the corbelling-out part 55 of the folding table 53, see FIG. 3. As the operator does not reach as far as the stop 87, this is bear done by sending the sheet 5 in a little way on the folding table 53, following which the operator takes the second sheet 5 and pushes the first sheet 5 further until it rests against said stop 87.

The stop 87 and spacers 65, 77 are aligned in the longitudinal direction of the folding station 28 prior to the start of the folding process so that the two sheets 5 overlap over at best one prospective projection 12 and in such a way that the bends 9 end up in the necessary positions on folding of the projections 12 in relation to the two groups of folding rulers 68. The required distance between the respective table tops 56, 57 and power cylinders 64, 75 is also set in this connection. The measurement along the machine is varied by means of the spacers 65, 77. These are pushed forwards, or backwards along the central rail 63, or the two upper rails 76, to obtain a set distance between the cylinder groups 61, 62, 73, 74 and the intake 25, or the stop 87 respectively. The frames 66 of the spacers 65, 77 are moved away from or towards one another by means of setscrews 67 for adjusting the width of the spacers 65, 77, due to which the measurement between each group 61, 62, 73, 74 of power cylinders 64, 75 is varied to adjust the overlap of the sheets 5. However, the measurement between each individual power cylinder 64, 75 to vary the width of the panels 6, 7, 8 is rarely changed, owing to the bends 9 and recesses 22 already made in the cardboard blanks 3, 4.

The rear sheet 5, i.e. that located upstream, is positioned in the same way as before by means of a first manual fold over the upper edge 71 of the first folding ruler 68 pushed up. The folding process then proceeds in the same way as for the pallet 2 described above with only one load deck 3, with the difference that the load decks 3, depending on the overlap, are folded together at one projection 12 and that following folding of the load decks 3 two base beams 4 are placed one after another in the longitudinal direction of the load decks 3 for every one base beam 4 previously. The sheet 5 located downstream lies against the stop 87, for which reason it is already in its correct position from the start when it acquires its first crease 12, at the same time as and together with the upstream, overlapping sheet 5 receiving its last projection crease 12.

In one embodiment of a half-pallet, with a double load deck 3 in the longitudinal direction and a common central part formed by overlapping, comprising an overlapped projection 12 and two partly overlapped central panels, which central panel consists of two edge panels 7, 8 and two main panels 6, a bit has to be removed from at least one base beam 4 to reduce the total base beam length. This is when the finishing end 24 of the base beam 14 located downstream adjoins the starting end 23 of the base beam 4 located upstream.

In an alternative embodiment, when only the edge panels 7, 8 overlap one another and in which lengthened base beams 4 or overlapping base beams 4 moved slightly parallel to one another are used to join the two load decks 3, the first and second groups 61, 62, 73, 74 of power cylinders 64, 75 must be displaced closer to one another so that the distance between the two cylinder groups 61 and 62, or 73 and 74 remains the same as the width of the edge panels 7, 8. The reciprocal distance between each power cylinder 64, 75 in each group 61, 62, 73, 74 continues to be the same, i.e. the same distance as a main panel is wide. In a deck 3 which is twice as long, the central panel is also a main panel 6, for which reason the two groups of cylinders are moved away from one another.

When manufacturing wider pallets 2, two load decks 3 are fitted side by side. The locking device 80 is released, following which the upper rails 76 supported by means of supporting wheels 79 are displaced sideways along the upper cross-members 49, depending on how wide the pallets which are to be assembled are. In the correct position, the setscrew 81 is tightened once more against the cross-member 49 by means of the guide wheel 82. Folding and assembly of this wider pallet then proceeds in the same manner as before.

What is claimed is:

1. Process for production of pallets (2), which are assembled from several base beams (4) and at least one load deck (3), which is folded to form a deck level (10) comprising essentially prism-shaped stiffners in the form of deck projections (12), which load deck (3) is anchored to the base beams (4) in that the projections (12) are inserted into recesses (22) in the base beams (4), which recesses (22) have essentially the same shape as the outer cross-section of the projection (12), characterized in that production takes place in a pallet assembly machine (1) in that a folded load deck (3) is produced from at least one flat sheet (5) provided with bends (9) by folding of the sheet (5) at set bends (9), which are to be arranged in the corners of the recesses (22), a first bend (9) between two of the sides (13, 15) of the projections (22) being folded so that first projection creases (12) are formed, that a number of base beams (4) are placed in a prefixed position to the load deck (3) thus folded forming a preferred pallet (2), the projection creases (12) first being brought into position inside the respective recesses (22), following which the remaining bends (9) of the projection (12) are pressed into the recesses (22) so that the projections (12) acquire the aforesaid essentially primsatic shape and due to which the projections (12) are permanently fixed in the recesses (22) due to the contact obtained between all sides (13, 15, 16) of the projections (12) and said recesses (22).

2. Process according to claim 1, characterized in that the bend (9) located downstream in each prospective projection (12) is the last to be pushed up into the correct position in the respective recesses (22) of the base beam (4).

3. Process according to claim 1, characterized in that a wider pallet (2) is assembled from two load decks (3) side by side.

4. Process according to claim 1, characterized in that folding of the first bend (9) between two of the sides (13, 15) of the projections (22) takes place in a folding station (28), said first projection creases (12) being formed, that the preferred pallet (2) is transported to an assembly station (29), in which a folding-in device (107) folds up the remaining bends (9) of the sheet (5), so that the projections (12) acquire the essential prism shape, the projections (12) being pressed in and being fixed permanently, preferably free from the use of bonding agents or other fasteing elements, in the recesses (22).

5. Process according to claim 4, characterized in the several cardboard sheets (5) are arranged one after another in a longitudinal direction to form an extended deck level (10).

6. Process according to claim 4, characterized in that transportation to the assembly station (29) takes place by means of a conveyor (30), that the folding-in device (107), which comprises a folding device (113), folds up the remaining bends (9) of the sheet (5) in coordination with the conveyor belts (94, 95) between which the pallet (2) is transported and a press roll (103), and that permanent fixing of the projections (12) in the recesses (22) is effected by passage of the pallet (2) between opposing outlet rolls (96).

7. Process according to claim 6, characterized in that the conveyor (30) gives the palle (2) into the assembly station (29) between two intake rolls (97), from where the upper and lower conveyor belts (94, 95) take over transportation through the assembly station (29).

8. Process according to claim 6, characterized in that a processing force on the projection creases (12) inside the recesses (22) is obtained when the two conveyor belts (94, 95) converge towards one another, and that the projection creases (12) are thereby pressed inwards into the recesses (22).

9. Process acording to claim 4, characterized in that the folding-in device (107), on transportation of the pallet (2) through the assembly station (29), guides the bend (9) between the base panel (13) of the projection (12) and the longitudinal side (15) of the projection (12) located most upstream in towards the upstream corner of the recess (22) at the same time as the bend (9) located downstream between same base panel (13) and its longitudinal side (16) located downstream is folded, following which the folding-in device (107) continues with the next projection crease (12) in the same way, until all bends (9) are brought into the correct position prior to final fixing between the outlet rolls (96).

10. Process according to claim 7, characterized in that the pallet (2) is transported to the press roll (103), which presses the pallet (2) against the upper conveyor belt (94), the bends (9) of the projection (12) inside the recess (22) being pressed in each towards its corner of the recess (22) and that the final compression of the pallet (2), with which the projection (12) is permanently fixed in the recess (22), takes place following this between the outlet rolls (96).

11. Process according to claim 4, characterized in that the sheet (5) is placed on top of a folding table (53) in the folding station (28), that a power cylinder (64) is activated, a first folding rule (68) being pushed up above the working surface (72) of the folding table (53), that a first bend (9) is folded over the folding ruler (68), that power cylinders (75) above the folding table (53) are activated so that a first gripping device pair (83) meets the folding rule (68) and grips the sheet (5) so that this is clamped against the sides of the folding rule (68), following which a second folding rule (68) is pushed up and opposing upper power cylinder pair (75) is activated and its gripping device (83) folds the sheet (5) at a second bend (9), following which the process continues until the sheet (5) is folded at all current projections (12) each over their folding rule (68).

12. Process according to claim 11, characterized in that the bends (9) which are folded over the folding rulers (68) consist of the bends (9) between the rear longitudinal sides (15) and base sides (13) of the projections (12), seen in the direction of transportation (27) of the pallet (2).

13. Process according to claim 11, characterized in that the base beams (4) are placed over the width of the pallet (2), each base beam (4) being arranged in such a position that its recesses (22) prefix all projection creases (12) following which the gripping devices (83) are opened and the respective gripping device (83) and folding ruler (68) are returned to their starting position, so that a prefixed pallet (2) remains on the folding table (53) ready for onward transportation.

14. Pallet assembly machine for the production of pallets (2), which are assembled from a number of base beams (4) with recesses (22) and at least one load deck (3) to form a deck level (10), which comprises essentially prism-shaped stiffeners in the form of deck projections (12) for anchoring to the recesses (22) of the base beams (4), characterized in that the pallet assembly machine (1) comprises a folding station (28) for production of a folded load deck (3) and an assembly station (29) for fitting of the load deck (3) to the base beams (4).

15. Pallet assembly machine according to claim 14, characterized in that the folding station (28) has a folding table (53), a number of power cylinders (64) fitted under the folding table (53) on which displacable folding rulers (68) are mounted, a corresponding number of upper power cylinders pairs (75), which are arranged above and across the folding table (53) and fitted controllably to which upper power cylinders (75) are gripping devices (83).

16. Pallet assembly machine according to claim 15, characterized in that the upper power cylinder pairs (75) are arranged in line with and each in front of the plane of their folding ruler (68).

17. Pallet assembly machine according to claim 15, characterized in that each folding rule (68) is arranged such that in the retracted position of the power cylinder (64), the top edge (71) of the folding rule (68) is located inside a gap (60) below the working surface (72) of the folding table (53) and in the projected position of the power cylinder (64) located at a set distance above said working surface (72).

18. Pallet assembly machine according to claim 17, wherein during the production of pallets (2), the load deck (3) is divided by bending (9) into a number of panels (6, 7, 8) parallel to one another, which comprise a number of main panels (6) and two edge panels (6, 8), and which edge panels (7, 8) are situated at each end of the deck level (10), and further characterized in that the folding table (53) comprises displaceable table tops (56, 57) which contain the essentially vertical gaps (60), which are continuous and have an equal spacing which corresponds to the width of the main panel (6) of the pallet (2), that the distance between the table tops (56, 57) is set so that the minimum distance between the two closest gaps (6) in each table top (56, 57) corresponds to at least the width of the edge panels (7, 8) of the load deck (3).

19. Pallet assembly machine according to claim 15, characterized in that the power cylinders (64) under the folding table (53) are fitted detachably in groups (61, 62), which power cylinders (64) preferably have a mutually equal spacing within each group (61, 62), the two groups (61, 62) of power cylinders (64) being displaceable in relation to one another.

20. Pallet assembly machine according to claim 15, characterized in that the power cylinder pairs (75) arranged at a distance above the folding table (53) are detachably fitted in groups (73, 74) and, for each group (73, 74), in a number which corresponds to the number of projections (12) for a load deck (3).

21. Pallet assembly machine according to claim 20, characterized in that each group (73, 74) of power cylinder pairs (75) is intended for displacement across the folding station (28) and that a locking device (80) is present for fixedly locking each group (73, 74) of power cylinder pairs (75) at a set position across the folding station (28).

22. Pallet assembly machine according to claim 15, characterized in that a gripping device (83) is fitted controllably to each upper power cylinder (75).

23. Pallet assembly machine according to claim 14, characterized in that the assembly station (29) comprises an upper and lower conveyor belt (94, 95), each of which is disposed to run in its loop, a driver motor (101) for driving the conveyor belts (94, 95), a press roll (103) which is rotatably arranged inside preferably the loop of the lower conveyor belt (95) and that the assembly station (29) also comprises a folding-in device (107) for folding the bend (9) remaining from the folding station (28) for each projection (12).

24. Pallet assembly machine according to claim 23, characterized in that the folding-in device (107) comprises a number of folding devices (113) and arranged on which folding devices (113) is a gripping device (116) for said folding-in.

25. Pallet assembly machine according to claim 24, characterized in that the folding-in device (107) comprises a number of rotatably fitted levers (111), from which the folding devices (113) extend in the direction of the outlet (26) of the assembly station (29), which folding devices (113) comprise operating arms (114, 115) for operating the gripping device (116).

26. Pallet assembly machine according to claim 23, characterized in that a front and a rear rotatable roll (96, 97) extend across the assembly station (29) at an intake (37) and an outlet (26) to the assembly station (29) snf that the three rolls (96, 97, 103) are arranged on such vertical levels in relation to one another that the upper loop part (104) of the lower conveyor belt (95) forms two running planes (105, 106) on each side of the press roll (103), which belt planes (105, 106) converge towards the horizontally arranged lower loop part (100) of the upper conveyor belt (94).

27. Pallet assembly machine according to claim 26, characterized in that the assembly station (29) comprises two essentially horizontal frames (91, 92) arranged one above the other, and in which frames (91, 92) the outlet rolls (96) are arranged at a fixed distance, which distance corresponds to the thickness of an assembled pallet (2), and that a plate (99) is fitted inside a lower loop part (100) of the upper conveyor belt (94) to form a surface against which a pallet (2) conveyed by the conveyor belts (94, 95) is intended to be pressed.

28. Pallet assembly machine according to claim 14, characterized in that the pallet assembly machine (1) also has a conveyor (30) arranged between the folding station (28) and the assembly station (29).

29. Pallet assembly machine according to claim 28, characterized in that the folding station (28) has a folding table (53), and the folding table (53) has a controllable stop (87), which can be set in a position obstructing a pallet (2) transported by the conveyor (30) and a position releasing the pallet (2).

30. Pallet assembly machine according to claim 28, characterized in that the conveyor (30) also comprises a number of sensors for detecting the presence, position and alignment of a pallet (2) conveyed on the conveyor (30).

31. Pallet assembly machine according to claim 30, characterized in that the sensors consist of mechanical, electrical or optical contact breakers.

32. Pallet assembly machine according to claim 14, characterized in that a detector arm (121) is disposed to detect the projection creases (12) of the transported pallet (2).

* * * * *